Oct. 4, 1955  B. E. PRITCHARD  2,719,397
POWER MOWER
Filed Feb. 9, 1953  2 Sheets-Sheet 1
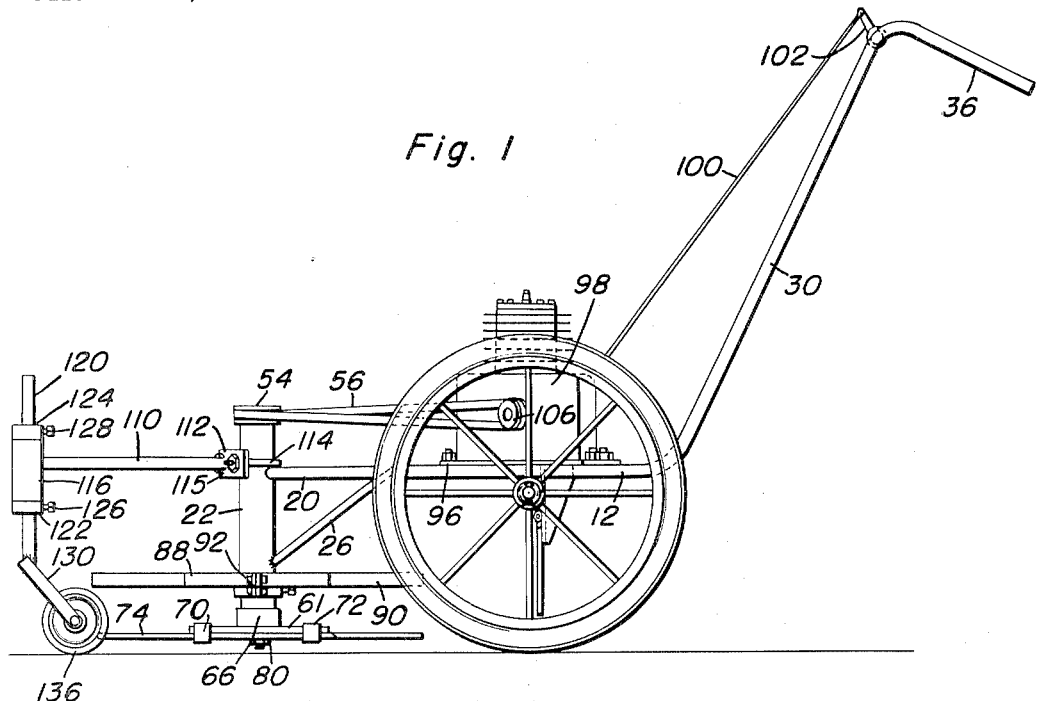
Fig. 1
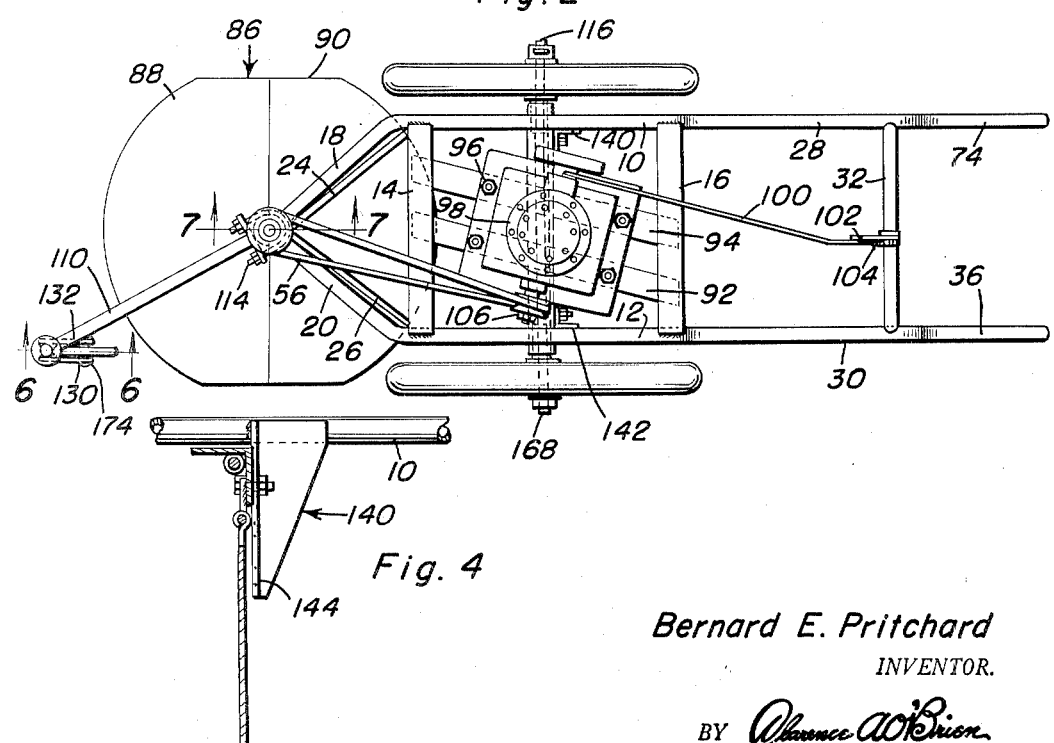
Fig. 2
Fig. 4
Bernard E. Pritchard
INVENTOR.
BY Clarence A. O'Brien
and Harvey B. Jacobson
Attorneys Oct. 4, 1955  B. E. PRITCHARD  2,719,397
POWER MOWER
Filed Feb. 9, 1953  2 Sheets-Sheet 2
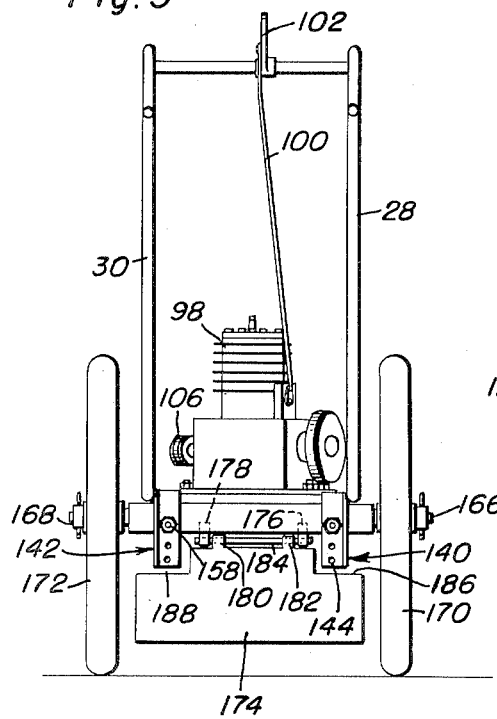
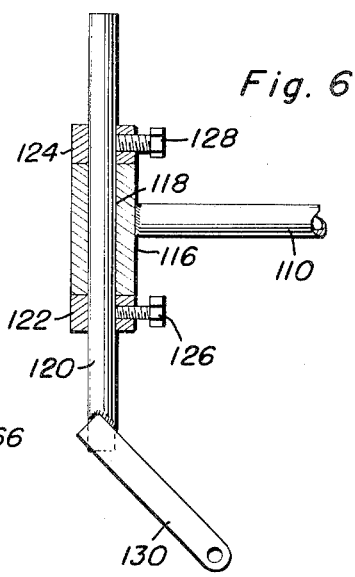
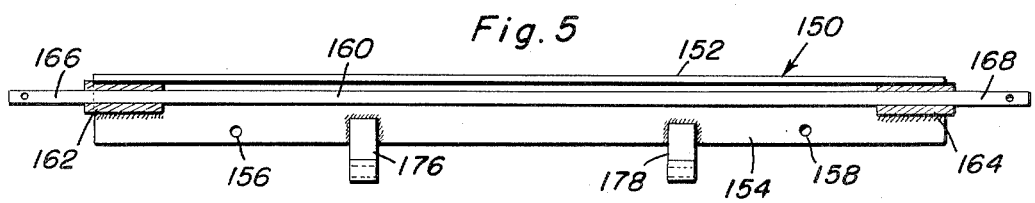
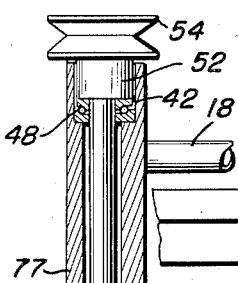
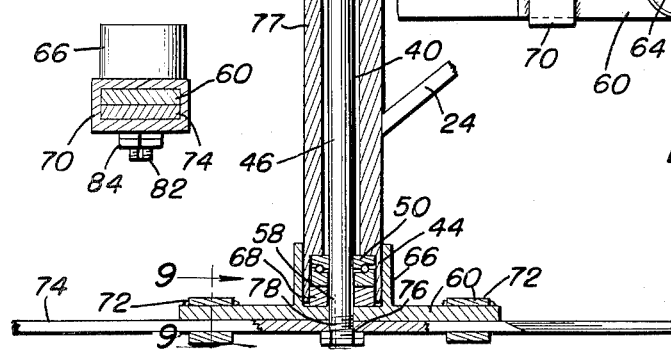
Bernard E. Pritchard
INVENTOR.

United States Patent Office 2,719,397
Patented Oct. 4, 1955

2,719,397

POWER MOWER

Bernard E. Pritchard, Canton, Ill., assignor to Harry Yetter, Colchester, Ill.

Application February 9, 1953, Serial No. 335,830

7 Claims. (Cl. 56—25.4)

This invention relates to a lawn mower and particularly to a skeleton frame lawn mower having a horizontally rotating cutting blade and means for adjusting the height of the blade while maintaining the same in horizontal relation.

This application is a continuation-in-part of application Serial No. 202,198, filed December 22, 1950, and now abandoned.

In power mowers of the lawn trimmer type, it has been found desirable to use rotating type blades swinging in a plane parallel to the surface of the ground to provide a desirable cutting action with respect to the vegetation forming the lawn. A marked disadvantage of such trimmers has been the excessive weight of the machines and the inability to adjust the height of the blade while maintaining the blade parallel to the surface of the ground. Further, disadvantages have been found in that the powered support, or usually caster wheel, has been fixed with respect to the frame of the machine so that there have been frequent disadvantages in approaching the cutter in proximity to various impediments such as trees, shrubs, the sides of walks or the like.

The present invention provides a simple, light-weight power mower having a swinging arm by which the caster wheel may be swung in a plane parallel to the plane of operation of the cutter and having means for adjusting both the main and caster wheel so that the cutting blade may be maintained in horizontal relation at various heights from the ground.

It is accordingly an object of the invention to provide an improved power mower.

It is a further object of the invention to provide a power mower of the horizontal swinging type having means for adjusting the height of cutting blade while maintaining the blade in parallel relation to the ground.

A further object of the invention is to provide a power mower in which the guide wheel may be adjusted with respect to the frame of the mower.

It is a further object of the invention to provide an improved mounting for the cutter bar of a mower.

It is a further object of the invention to provide an improved deflector plate to prevent soiling of the clothing of the operator of the machine.

It is a further object of the invention to provide an improved means of mounting the cutter bar on a rotary mower.

Other objects and many of the attendant advantages of the present invention will be apparent from the following detailed description taken in conjunction with the accompanying drawing, in which:

Figure 1 is a side elevation of a power mower according to the invention;

Figure 2 is a top plan view of the mower of Figure 1 and showing the details of mounting the motor thereon as well as the swinging arm for the guide wheel;

Figure 3 is a rear elevation of the power mower of Figures 1 and 2;

Figure 4 is an enlarged fragmentary elevational view, with parts broken away and shown in section, of the device showing the frame, bracket and deflector plate;

Figure 5 is an enlarged elevation, partly in section, of the axle construction;

Figure 5 is an enlarged vertical section of the adjustable pivot shaft of the guide wheel and taken substantially on the plane indicated by the line 6—6 of Figure 2;

Figure 7 is an enlarged vertical section of the blade mounting taken substantially on the plane indicated by the line 7—7 of Figure 2;

Figure 8 is a fragmentary enlarged bottom view of the sickle mounting; and

Figure 9 is an enlarged cross-section through the sickle mounting socket taken substantially on the plane indicated by the line 9—9 of Figure 7.

In the exemplary embodiment of the invention, the frame of the mower comprises a pair of tubular side bars 10 and 12 arranged in spaced parallel relation and being rigidly secured together by cross-members 14 and 16 to provide a substantially rectangular skeleton frame. The forward end sections 18 and 20 of the side rails 10 and 12 are bent into converging relation so that they substantially meet and they are rigidly joined together to a vertically extending substantially tubular bearing member 22. Brace members 24 and 26 are attached to the bearing member 22 in spaced relation from the connection to the members 18 and 20 and extend substantially in converging relation therewith and are rigidly connected to the side members 10 and 12, respectively.

Rear portions 28 and 30 of the rails 10 and 12 are bent upwardly to form upwardly extending guide members which are rigidly spaced apart by means of a spacer 32. The upper ends of the members 28 and 30 are bent downwardly to form handle members 34 and 36 for the convenience of the operator in guiding and operating the device.

The bearing member 22 is provided as a substantially tubular member having a bore 40 therein. The ends of the member 22 are provided with counterbores 42 and 44. A cutter shaft 46 extends through the bore 40 and is maintained in spaced relation thereto by means of anti-friction bearings 48 and 50 received in the counterbores 42 and 44, respectively, and being engaged with the shaft 46. The hub 52 is rigidly fixed to the top of the shaft 46 and extends within and seals the counterbore 42. A sheave 54 for receiving a driving belt 56 is rigidly mounted on the hub 52.

The bottom end of the shaft 46 is provided with a longitudinally extending key way 58. A cutter bar 60 is provided with an aperture 62 having a key 64 for engagement with the key way 58. The bar support 60 is provided with an upstanding collar or cup-shaped member 66 which embraces the lower end and extends in telescoping relation with the lower end of the bearing member 22. A suitable spacer member 68 may be provided between the bars 60 and the lower bearing 50.

Bar 60 is provided adjacent the opposite ends thereof with blade receiving sockets 70 and 72. Preferably these sockets are provided as substantially rectangular rings which are secured to the top of the bar 60 and extend therebelow so that the cutter blade 74 may be slid through the sockets 70 and 72, the blade having an aperture 76 therein which corresponds with the aperture 62 of the bar member. Preferably the lower end of the shaft 46 is provided with threads 78 for the reception of a lock nut 80. Blade 74 may be further secured by means of set screws 82 and lock nuts 84 in the sockets 70 and 72, respectively.

A guard plate 86 may be clamped on the bearing member 22, and is preferably constructed as two half sections 88 and 90 having a clamping collar 92 securing the sections together and in firm engagement with sides of the member 22.

A motor mounting includes a pair of mounting strips 92 and 94 for receiving the mounting bolts 96 of a suitable motor 98 herein shown as a gasoline motor having a control rod 100 actuated by means of a control handle 102 which is preferably journaled on the spacer member 32 and may be provided with a sector gear 104 for locking the rod and handle in any desired position. In order to prevent undue wear and strain on the belt 56, it is desired to mount the motor so that the drive sheave 106 will readily align with the position of the belt between the sheaves 106 and 54 and for this reason, the motor is mounted diagonally with respect to the platform provided by the side rails 10 and 12 and the cross-members 14 and 16. For convenience in making such mountings, the mounting bars 92 and 94 are arranged diagonally to the frame of the power mower so that the motor will be mounted in a properly designed diagonal position.

The guide wheel arrangement of the device provides an arm 110 having a base 112 which is connected to the bearing member 22 by means of a U-bolt 114. A vertically disposed hub 116 is rigidly attached to the outer portion of the arm 110 and is provided with a suitable aperture 118 through which extends a pivot bar 120. Pivot bar 120 is provided with a pair of collars 122 and 124 which are arranged at opposite ends of the hub 116 and are adjustable on the pivot rod 120 by means of the set screws 126 and 128. Substantially parallel straplike fork members 130 and 132 are arranged on opposite sides of the bottom end of the shaft 120 and are rigidly secured thereto. A shaft 134 is mounted in the lower ends of the fork members 130 and 132, and a suitable caster wheel 136 is journaled thereon.

Wheel mounting brackets 140 and 142 are rigidly connected to the side rails 10 and 12, respectively, and are preferably constructed as substantially angle members having one flange connected to the members 10 and 12 respectively, and the other member or flange extending laterally inward therefrom. The inwardly extending flange of the angle members is provided with a plurality of apertures 144 for adjustably receiving an axle member presently to be described.

An axle construction for supporting the framework comprises an angle member 150 having a forwardly directed flange member 152 and a downwardly directed flange member 154. Apertures 156 and 158 are provided for matching with the apertures 144 in the members 140 and 142. Fasteners, such as the bolts 158, may be passed through the apertures 156 and selected ones of the apertures 144 so that the angle member may be mounted at any desired distance from the platform of the device. An axle bar 160 is secured within the apex of the angle member by any suitable means, such as the blocks 162 and 164. The rod 160 extends longitudinally beyond the end of the angle member 150 to provide wheel bearing axles 166 and 168 on which are mounted wheels 170 and 172.

A deflector plate 174 is hingedly connected to the flange 154 by means of a pair of I-straps 176 and 178 secured to the depending flange 154 by any suitable means, such as welding. The top of the plate 74 is provided with a pair of eyes 180 and 182 through which extends a pintle pin 184 for hingedly connecting the plate 174 in depending relation to the downwardly extending flange 154. The corners of the plate 174 are cut away, as at 186 and 188, to provide notches for clearance with the depending brackets 140 and 142 so that the deflector plate 174 may readily swing with respect to the vehicle without interference by means of the brackets.

In the operation of the mower according to the invention, the cutter bar 74 will be provided within the mounting bar 60 and held in position by means of the nut 80. The guide wheel will be adjusted by loosening the nuts 115 of the U-bolts 114 so that the arm 110 may be adjusted with respect to the framework of the power mower.

The height of the forward end of the vehicle will be determined by adjusting the collars 124 and 122 so that the pivot rod will have any desired proportion extended. The rear portion of the vehicle will then be adjusted by means of the bolts 158 which will be selectively engaged with the apertures 144 so that the axle member will be any desired distance from the framework of the vehicle. The belt 56 will then be adjusted between the sheaves 54 and 106 which because of the diagonal position of the motor 98 will provide a straight run for the belt with a minimum wear thereon. The motor will then be adjusted by means of a handle 102 and the control rod 100 to operate at the desired speed after which the operator will produce motion of the vehicle by pushing on the handles 34 and 36.

It will thus be seen that the present invention provides a power mower which may be readily adjusted as to height while maintaining the cutter bar in horizontal relation with respect to the ground.

While for purposes of exemplification, a simplified embodiment of the invention has been shown and described according to the best present understanding thereof, it will be apparent to those skilled in the art that changes may be made in the construction and arrangement of the parts thereof without departing from the true spirit and purpose of the invention.

What is claimed as new is as follows:

1. A power mower comprising a frame including a pair of spaced apart tubular side rails, each of said side rails including a forward portion converging into proximity with the other, a tubular bearing member rigidly joined to said converging ends, brace members secured to said bearing member in spaced relation to said converging ends, said brace members being rigidly attached to said side rails, a rear portion of said rails extending upwardly and rearwardly and constituting handles for said frame, a cutter shaft journaled in said bearing member, driving means connected in driving relation to said cutter shaft, a cutter secured on said shaft, depending brackets mounted on said rails, said brackets having a plurality of vertically spaced apertures therein, an axle including an angle member, fastening means interconnecting said brackets and angle member securing said angle member in selected ones of said vertically spaced apertures.

2. A power mower comprising a frame including a pair of spaced apart tubular side rails, each of said side rails including a forward portion converging into proximity with the other, a tubular bearing member rigidly joined to said converging ends, brace members secured to said bearing member in spaced relation to said converging ends, said brace members being rigidly attached to said side rails, a rear portion of said rails extending upwardly and rearwardly and constituting handles for said frame, a cutter shaft journaled in said bearing member, driving means connected in driving relation to said cutter shaft, a cutter secured on said shaft, depending brackets mounted on said side rails, said brackets having a plurality of vertically spaced apertures therein, an axle including an angle member, fastening means interconnecting said brackets and angle member securing said angle member in selected ones of said vertically spaced apertures, an arm swingingly adjustable with respect to said bearing member, a hub member mounted on said arm, a caster journaled in said hub, said caster being adjustably mounted in said hub.

3. In a power mower having a skeleton frame and a forward bearing member supporting a cutter blade, a cutter adjustment including a pair of spaced apart depending brackets secured on the frame, each of said brackets having a plurality of vertically arranged apertures, an axle construction including an elongated angle member, an axle rod secured in said angle member, said rod extending beyond the end of the angle member to provide wheel receiving axles, said angle member having apertures positioned to match with the apertures in said brackets, said apertures being selectively engaged to determine the spacing of said axle from said frame.

4. In a power mower having a skeleton frame and a forward bearing member supporting a cutter blade, a cutter adjustment including a pair of spaced apart depending brackets secured on the frame, each of said brackets having a plurality of vertically arranged apertures, an axle construction including an elongated angle member, an axle rod secured in said angle member, said rod extending beyond the end of the angle member to provide wheel receiving axles, said angle member having apertures spaced apart to match with the apertures in said brackets, said apertures being selectively engaged to determine the spacing of said axle from said frame, a forwardly extending arm angularly adjustable with respect to said frame, a vertically positioned hub on said arm, a pivot rod journaled in said hub, a caster wheel mounted on said pivot rod, adjustable collars on said pivot rod on either side of said hub.

5. In a power mower having a wheel supported frame, a cutter mount comprising a vertically disposed tubular bearing member, said bearing member being counterbored at each end, a cutter shaft extending through said bearing element, anti-friction bearings interposed between said shaft and said bearing member, said bearing being received in said counterbores, a sheave fixed on the upper end of said shaft, a hub fixed to said sheave and extending into the counterbore at the upper end of said bearing member, a cutter mounting bar non-rotatably mounted adjacent the lower end of said cutter shaft, a collar on said mounting bar extending in telescoping relation with the bottom of said bearing member, blade receiving sockets fixed on said mounting bar, and retaining means engaging the cutter shaft.

6. In a mower having a frame carrying a horizontally rotating cutter blade, a blade height adjuster comprising a pair of depending transversely spaced mounting brackets fixed on the frame, said brackets each having a plurality of vertically arranged apertures therein, an axle construction including an angle bar, said angle bar having apertures for matching the apertures in said brackets, fastening means for selectively mounting said angle bar on said brackets, an axle bar fixed to said angle bar and extending beyond the ends thereof, wheel members journaled on said projecting ends.

7. In a mower having a frame carrying a horizontally rotating cutter blade, a blade height adjuster comprising a pair of depending transversely spaced mounting brackets fixed on the frame, said brackets each having a plurality of vertically arranged apertures therein, an axle construction including an angle bar, said angle bar having apertures for matching the apertures in said brackets, fastening means for selectively mounting said angle bar on said brackets, an axle bar fixed to said angle bar and extending beyond the ends thereof, wheel members journaled on said projecting ends, an arm mounted on said frame for angular adjustment in a plane parallel to the plane of rotation of the cutter, a vertically disposed hub on said arm, a pivot shaft journaled in said hub, a pair of longitudinally adjustable collars secured on said pivot shaft, a pair of parallel angularly disposed fork members rigidly fixed on said pivot bar, a wheel journaled between said fork members.

References Cited in the file of this patent

UNITED STATES PATENTS

| 2,232,671 | Loder | Feb. 18, 1941 |
| 2,477,442 | Cramer, Jr., et al. | July 26, 1949 |
| 2,491,768 | Roof | Dec. 20, 1949 |
| 2,515,573 | Soenkson | July 18, 1950 |
| 2,521,972 | Haglund et al. | Sept. 12, 1950 |
| 2,595,976 | Patterson | May 6, 1952 |